(12) United States Patent
Moon et al.

(10) Patent No.: US 11,774,370 B2
(45) Date of Patent: Oct. 3, 2023

(54) APPARATUS FOR PROCESSING SUBSTRATE AND METHOD FOR MEASURING TEMPERATURE OF SUBSTRATE

(71) Applicant: AP SYSTEMS INC., Hwaseong-Si (KR)

(72) Inventors: Yong Soo Moon, Incheon (KR); Hahn Joo Yoon, Osan-si (KR); Chan Ho Hong, Hwaseong-si (KR); Seung Hwan Lee, Osan-si (KR); Oh Seung Kwon, Osan-si (KR)

(73) Assignee: AP SYSTEMS INC.

( * ) Notice: Subject to any disclaimer, the term of this patent is extended or adjusted under 35 U.S.C. 154(b) by 72 days.

(21) Appl. No.: 17/507,797

(22) Filed: Oct. 21, 2021

(65) Prior Publication Data

US 2022/0128484 A1 Apr. 28, 2022

(30) Foreign Application Priority Data

Oct. 27, 2020 (KR) .................. 10-2020-0140475

(51) Int. Cl.
  *G01N 21/95* (2006.01)
  *G01N 21/88* (2006.01)
  *G01K 13/00* (2021.01)

(52) U.S. Cl.
  CPC ......... *G01N 21/95* (2013.01); *G01N 21/8806* (2013.01); *G01K 13/00* (2013.01)

(58) Field of Classification Search
  CPC .. G01K 13/00; G01K 11/125; G01N 21/8806; G01N 21/95; H03B 5/24; H03M 1/007; H03M 1/0854; H03M 1/12; H03M 1/124; H03M 1/60; H03M 3/344; H04R 19/04; H04R 2201/003; H04R 2410/03; H04R 3/00; G01J 5/0007; G01J 5/06
  USPC ....................... 356/237.1–237.6, 239.1–239.8
  See application file for complete search history.

(56) References Cited

U.S. PATENT DOCUMENTS 5,830,277 A * 11/1998 Johnsgard ......... H01L 21/67248
 118/712

FOREIGN PATENT DOCUMENTS

| JP | 2003106902 A | 4/2003 |
| KR | 20030060408 A | 7/2003 |
| KR | 20100064486 A | 6/2010 |

* cited by examiner

Primary Examiner — Tri T Ton
(74) Attorney, Agent, or Firm — Renaissance IP Law Group LLP

(57) ABSTRACT

Provided are an apparatus for processing a substrate and a method for measuring a temperature of the substrate. The apparatus for processing the substrate includes a temperature measurement part and a light-transmitting shield plate. The temperature measurement part includes a light source, a light receiving part configured to receive reflected light reflected by the substrate or the shield plate among the light irradiated from the light source, and a radiant light emitted from the substrate to measure a quantity of the reflected light and an intensity of the radiant light and a temperature calculation part configured to calculate the temperature of the substrate, to which a contamination level of the shield plate is reflected, by using the quantity of the reflected light and the intensity of the radiant light.

14 Claims, 6 Drawing Sheets

(a)

(b)

WHEN NOT CONTAMINATED (a)

WHEN CONTAMINATED (b)

APPARATUS FOR PROCESSING SUBSTRATE AND METHOD FOR MEASURING TEMPERATURE OF SUBSTRATE

CROSS-REFERENCE TO RELATED APPLICATION

This application claims priority to Korean Patent Application No. 10-2020-0140475 filed on Oct. 27, 2020 and all the benefits accruing therefrom under 35 U.S.C. § 119, the contents of which are incorporated by reference in their entirety.

BACKGROUND

The present disclosure relates to an apparatus for processing a substrate and a method for measuring a temperature of the substrate, and more particularly, to an apparatus for processing a substrate and a method for measuring a temperature of the substrate, which minimize a temperature measurement deviation of a temperature measurement part.

In a thermal processing process using a rapid thermal processing (RTP) apparatus, a substrate is supported on an edge ring, and then, a top surface of the substrate is heated using a heating source disposed above the substrate to measure a temperature of the substrate at a lower side of the substrate so as to precisely adjust a process temperature. Here, a number of contaminants (or process by-products) may be generated during the thermal processing process, and the contaminants may contaminate the temperature measurement part such as a pyrometer, and thus, as the number of times of thermal processing processes increases, precision of the temperature measurement of the substrate may be deteriorated, and also, the temperature measurement part may be damaged.

To prevent the contamination of the temperature measurement part, a shield plate may be disposed between an open portion of the edge ring and the temperature measurement part. In this case, the contaminants may be accumulated on the shield plate to interrupt the temperature measurement of the temperature measurement part, thereby causing a temperature measurement deviation of the temperature measurement part.

In the related art, to solve this limitation, the shield plate has to frequently replaced before the contaminants are accumulated to a certain level, and thus, process costs may increase, and a downtime of the apparatus may increase. Therefore, there is a need for a method capable of increasing in replacement cycle of the shield plate in the rapid thermal processing (RTP) apparatus.

PRIOR ART DOCUMENT

Patent Document

Korean Patent Publication No. 10-2003-0060408

SUMMARY

The present disclosure provides an apparatus for processing a substrate and a method for measuring the substrate, which minimize a temperature measurement deviation of a temperature measurement part while preventing the temperature measurement part from being contaminated, through a shield plate.

In accordance with an exemplary embodiment, an apparatus for processing a substrate includes: a temperature measurement part configured to measure a temperature of the substrate by irradiating light onto one surface of the substrate; and a light-transmitting shield plate provided between the substrate and the temperature measurement part to prevent the temperature measurement part from being contaminated by process by-products; wherein the temperature measurement part includes: a light source configured to irradiate the light toward the substrate; a light receiving part configured to receive reflected light reflected by the substrate or the shield plate among the light irradiated from the light source, and a radiant light emitted from the substrate to measure a quantity of the reflected light and an intensity of the radiant light; and a temperature calculation part configured to calculate the temperature of the substrate, to which a contamination level of the shield plate is reflected, by using the quantity of the reflected light and the intensity of the radiant light, which are measured.

The temperature measurement part may further include: a relationship setting part configured to set a relationship between the measured quantity of the reflected light and an emissivity of the substrate; and a resetting part configured to reset the relationship between the measured quantity of the reflected light and the emissivity of the substrate by reflecting the contamination level of the shield plate, wherein the temperature calculation part may be configured to calculate the temperature of the substrate, by using the emissivity of the substrate, which is determined by the reset relationship between the measured quantity of the reflected light and the emissivity of the substrate, and an emission emitted from the substrate, wherein the emission emitted from the substrate is determined in accordance with the intensity of the radiant light.

The apparatus may further include a contamination level measurement part configured to measure the contamination level of the shield plate by using a reflection quantity of the light irradiated toward the shield plate, which is reflected by the shield plate and received.

The contamination level measurement part may include: a reflection quantity acquisition part configured to acquire the reflection quantity by the light reflected from the shield plate and received; and a contamination level calculation part configured to calculate the contamination level of the shield plate by calculating a difference value between the acquired reflection quantity and a reference reflection quantity of the shield plate.

The resetting part may be configured to primarily reset the relationship between the measured quantity of the reflected light and the emissivity of the substrate by reflecting the difference value calculated in the contamination level calculation part.

The resetting part may be configured to secondarily reset the primarily reset relationship between the measured quantity of the reflected light and the emissivity of the substrate to compensate the emission emitted from the substrate.

In the primary reset, the measured quantity of the reflected light may equally increase for each the emissivity of the substrate, and in the secondary setting, the measured quantity of the reflected light may differently decrease for each the emissivity of the substrate.

The apparatus may further include an emissivity relationship storage part configured to store the relationship between the measured quantity of the reflected light and the emissivity of the substrate in accordance with the contamination level of the shield plate, wherein the resetting part may be configured to select the relationship between the measured quantity of the reflected light and the emissivity of the substrate in the emissivity relationship storage part in accordance with the contamination level of the shield plate, which is measured in the contamination level measurement part.

In accordance with another exemplary embodiment, a method for measuring a temperature of a substrate includes: irradiating light through a shield plate on one surface of the substrate; measuring a quantity of reflected light and an intensity of a radiant light by receiving the reflected light reflected by the substrate or the shield plate among the irradiated light, and the radiant light emitted from the substrate; and calculating a temperature of the substrate, to which a contamination level of the shield plate is reflected, by using the measured quantity of the reflected light and the measured intensity of the radiant light.

The method may further include resetting of the relationship between the measured quantity of the reflected light and an emissivity of the substrate by reflecting the contamination level of the shield plate, wherein, in the calculating of the temperature of the substrate, the temperature of the substrate may be calculated by using the emissivity of the substrate, which is determined by the reset relationship between the measured quantity of the reflected light and the emissivity of the substrate, and an emission emitted from the substrate, wherein the emission emitted from the substrate is determined in accordance with the intensity of the radiant light.

The method may further include measuring the contamination level of the shield plate by using a reflection quantity of the light irradiated toward the shield plate, which is reflected by the shield plate and received.

The measuring of the contamination level of the shield plate may include: acquiring the reflection quantity by the light reflected from the shield plate and received; and calculating the contamination level of the shield plate by calculating a difference value between the acquired reflection quantity and a reference reflection quantity of the shield plate.

The resetting of the relationship between the measured quantity of the reflected light and the emissivity of the substrate may include primarily resetting the relationship between the measured quantity of the reflected light and the emissivity of the substrate by reflecting the calculated difference value.

The resetting of the relationship between the measured quantity of the reflected light and the emissivity of the substrate may include secondarily resetting the primarily reset relationship between the measured quantity of the reflected light and the emissivity of the substrate to compensate the emission emitted from the substrate.

In the primarily resetting, the measured quantity of the reflected light may equally increase for each the emissivity of the substrate, and in the secondarily resetting, the measured quantity of the reflected light may differently decrease for each the emissivity of the substrate.

The method may further include storing the relationship between the measured quantity of the reflected light and the emissivity of the substrate in accordance with the contamination level of the shield plate, wherein the resetting of the relationship between the measured quantity of the reflected light and the emissivity of the substrate may be performed by selecting the relationship between the measured quantity of the reflected light and the emissivity of the substrate in accordance with the measured contamination level of the shield plate.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
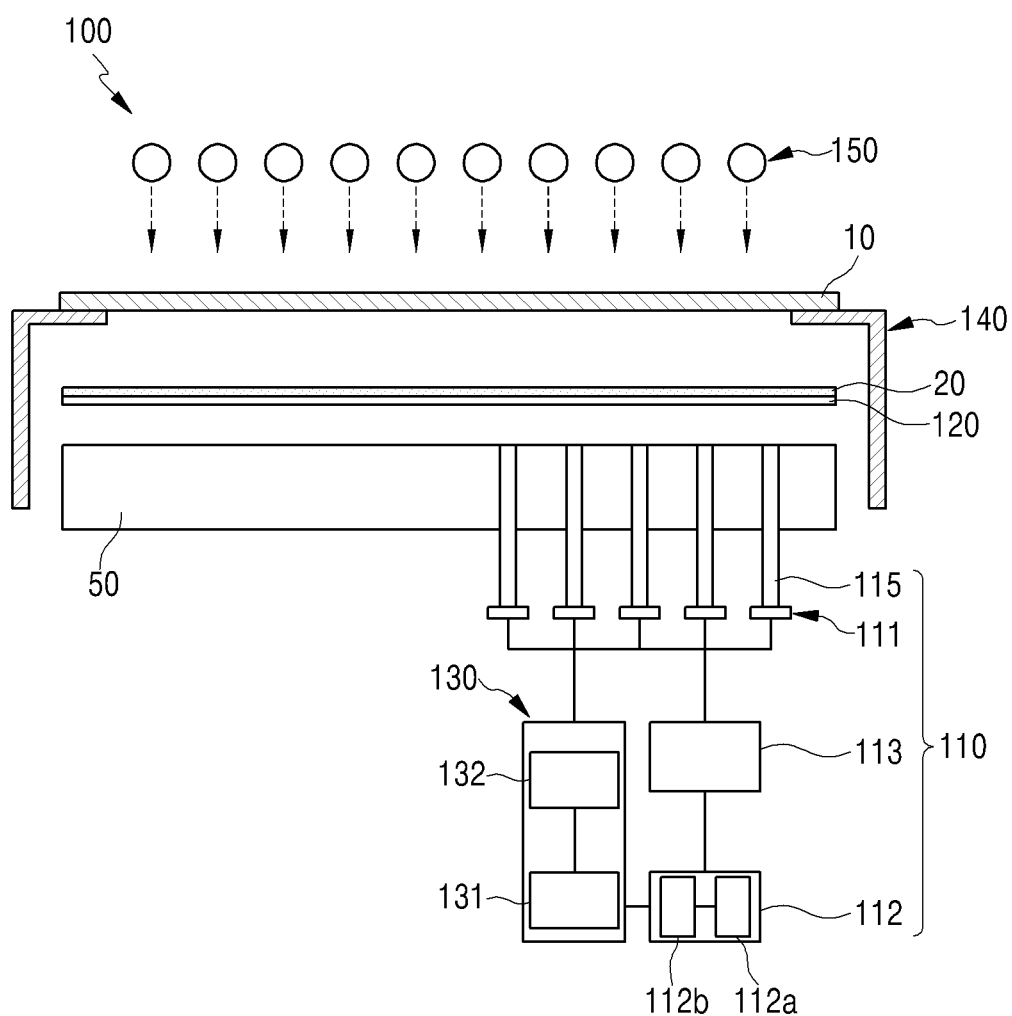
FIG. 1 is a view illustrating an apparatus for processing a substrate in accordance with an exemplary embodiment.

Hereinafter, specific embodiments will be described in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the descriptions, the same elements are denoted with the same reference numerals. In the figures, the dimensions of layers and regions are exaggerated for clarity of illustration. Like reference numerals refer to like elements throughout.

FIG. 1 is a view illustrating an apparatus for processing a substrate in accordance with an exemplary embodiment.

Referring to FIG. 1, in an apparatus 100 for processing a substrate may include a temperature measurement part 110 measuring a temperature of the substrate 10 by irradiating light 11a to one surface of a substrate 10 and a light-transmitting shield plate 120 provided between the substrate 10 and the temperature measurement part 110 to prevent the temperature measurement part 110 from being contaminated by process by-products.

The temperature measurement part 110 may measure a temperature T of the substrate 10 by irradiating the light 11a on one surface of the substrate 10, and the temperature T of the substrate 10 may be measured using reflected light 11c reflected from the substrate 10 and a radiant light 15 emitted from the substrate 10. For example, an emissivity of the substrate 10 may be calculated (or operated) by a quantity of the reflected light 11c reflected from the substrate 10, and an emission (or radiant energy) emitted from the substrate 10 may be calculated (or operated) by an intensity of the radiant light 15 emitted from the substrate 10. The temperature T of the substrate 10 may be calculated using the calculated (operated) emission E are emitted from the substrate 10 and the emissivity $\varepsilon$ of the substrate 10. Here, the intensity may be a concept including a quantity of light and/or a wavelength, and the temperature T of the substrate 10 may be expressed as a function (T=f(E, $\varepsilon$)) of the emission E emitted from the substrate 10 and the emissivity $\varepsilon$ of the substrate 10.

The temperature measurement part 110 may include a pyrometer or the like.

The shield plate 120 may be translucency with respect to the light 11 a (i.e., with respect to the light irradiated from a light source) and may be provided between the substrate 10 and the temperature measurement part 110 (i.e., between the edge ring, on which the substrate is supported, and the temperature measurement part) to prevent the temperature measurement part 110 from being contaminated by process by-products 20.

For example, the apparatus 100 for processing the substrate may be a rapid thermal processing (RTP) apparatus, and an edge portion of the substrate 10 may be supported on the edge ring 140 having an open portion in a center of the substrate 10. Here, the substrate 10 may be heated by the heat source 150 disposed above the edge ring 140 (i.e., above the substrate), and the temperature measurement part 110 may be disposed below the open portion of the edge ring 140 (i.e., below the substrate) to irradiate the light 11a to a bottom surface of the substrate 10, thereby measuring the temperature T of the substrate 10. Here, a number of contaminants (i.e., process by-products) may be generated during the thermal processing process, and the process by-products 20 may act as contaminants to contaminate the temperature measurement part 110 (e.g., an optical rod of the temperature measurement part). Thus, as the number of times of processes increases, precision in measurement of the temperature T of the substrate 10 may decrease, or at least some elements of the temperature measurement part 110 (e.g., the optical rod of the temperature measurement part) may be damaged.

Figure 2:
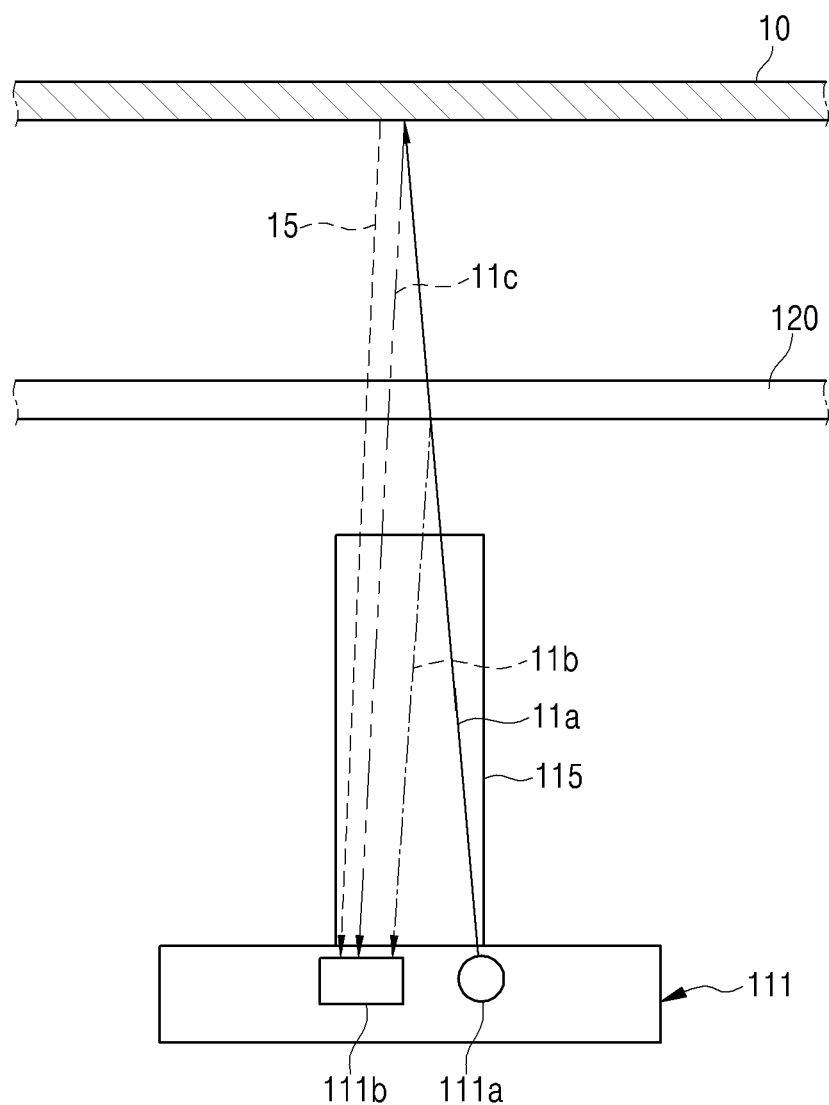
FIG. 2 is a schematic view illustrating a temperature measurement part in accordance with an exemplary embodiment.

FIG. 2 is a schematic view illustrating the temperature measurement part in accordance with an exemplary embodiment.

Referring to FIG. 2, the temperature measurement part 110 may include a light source 111a irradiating the light 11a toward the substrate 10, a light receiving part 111b receiving the reflected light 11b or/and 11c reflected by the substrate 10 or/and the shield plate 120 among the light 11a irradiated from the light source 111a, and the radiant light 15 emitted from the substrate 10 to measure the quantity of the reflected light 11b or/and 11c and the intensity of the radiant light 15, and a temperature calculation part 113 calculating the temperature of the substrate 10, in which the contamination level of the shield plate 120 is reflected, by using the quantity of the reflected light 11b or/and 11c and the intensity of the radiated light 15, which are measured.

The light source 111a may radiate the light 11a toward the substrate 10, and the irradiated light 11a may be reflected from the substrate 10 and then be incident (or received) into a light receiving part 111b. Since the shield plate 120 is disposed between the light source 111a and the substrate 10, the irradiated light 11a may pass through the shield plate 120 to reach the substrate 10, and the reflected light 11c reflected by reaching the substrate 10 may also pass through the shield plate 120 and then be received by the light receiving part 111b. Here, the irradiated light 11a may be partially reflected while being incident to the shield plate 120. The light 11a may be partially absorbed in the process of the transmission, and the reflected light 11c reflected from the substrate 10 may also be partially reflected while being incident to the shield plate 120 and be partially absorbed in the process of the transmission. Here, the light 11a irradiated from the light source 111a may have a wavelength different from that of the radiation light 15 emitted from the substrate 10.

The light receiving part 111b may receive the reflected light 1 lb and/or 11c reflected by the substrate 10 and/or the shield plate 120 (That is, at least one of the substrate and the shield plate) among the light 11a irradiated from the light source 111a, and the radiant light 15 emitted from the substrate 10. And the light receiving part 111b may measure the quantity of the reflected light 11b and/or 11c and the intensity of the radiant light 15 through the reflected light 11b and/or 11c and the radiant light 15, which are received. In this embodiment, since the shield plate 120 is disposed on the light receiving part 111b and the substrate 10, both the reflected light 11c reflected from the substrate 10 and the reflected light 11b reflected from the shield plate 120 may be generally received into the light receiving part 11b. If the partial reflection does not occur on the shield plate 120, only the reflected light 11c reflected by the substrate 10 may be received into the light receiving part 111b. In addition, the radiant light 15 emitted from the substrate 10 may also pass through the shield plate 120 and be received by the light receiving part 111b. Here, the radiant light 15 may also be partially reflected while incident to the shield plate 120 and partially absorbed in the process of the transmission. The light source 111a and the light receiving part 111b may be cased together by a housing to constitute a light receiving assembly 111.

The temperature calculation part 113 may calculate the temperature T of the substrate 10 using the intensity of the radiant light 15 and the quantity of the reflected lights 11b and/or 11c. Here, the emission E emitted from the substrate 10 may be calculated using the intensity of the radiant light 15 to, and the emissivity of the substrate 10 may be calculated using the quantity of the reflected light 11b and 11c. In addition, the temperature T of the substrate 10 may be calculated using the emission E are emitted from the substrate 10 and the emissivity ε of the substrate 10. At this time, since the shield plate 120 is disposed between the light receiving assembly 111 and the substrate 10, a deviation (or error) may occur between the quantity of the reflected light 11b and/or 11c and the intensity of the radiated light 15, which are received by the light receiving part 111b. Accordingly, a deviation may also occur between the emissivity ε of the substrate 10 and the emission E emitted from the substrate 10, and thus, a deviation may also occur in the temperature T of the substrate 10, which is calculated using the emissivity ε and the emission E. In addition, to calculate the emissivity ε of the substrate 10, only the reflected light 11c reflected only from the substrate 10 and directly incident to the light receiving part 111b has to be used. However, since the quantity of the reflected light 11c reflected from the substrate 10 as well as the quantity of the reflected light 11b reflected from the shield plate 120 is used due to the shield plate 120, a deviation of the emissivity of the substrate 10 calculated using the quantity of the reflected light 11b and/or 11c received to the light receiving part 111b may be larger. Here, the deviation may mean a difference between an actual value and a measured value (or calculated value).

For this reason, the temperature calculation part 113 may calculate the temperature T of the substrate 10 by further reflecting an attenuation coefficient η of the shield plate 120, and thus, the deviation in temperature T may be reduced. For example, the temperature T of the substrate 10 may be calculated by a function (T=f(E, ε, η) of the emission E emitted from the substrate 10, the emissivity ε of the substrate 10, and the attenuation coefficient η of the shield plate 120.

However, when the process by-products 20 are accumulated (or deposited) on the shield plate 120, the light may be reflected and/or absorbed from/in the process by-products 20, and thus, if the attenuation coefficient η of the shield plate 120 is further reflected, deviation in temperature T of the substrate 10 is inevitably large. In addition, as a (layer) thickness of the process by-products 20 increases due to an increase in the contamination level of the shield plate 120, the deviation in temperature T of the substrate 10 may increase. In this case, the process by-products 20 have different in material property (e.g., attenuation coefficient) depending on the type (or material) of the substrate 10, the type (or material) of a thin film deposited on the substrate 10, and a process gas, and the attenuation coefficient may vary depending on the deposited thickness of the process by-products 20. For this reason, the deviation in temperature T of the substrate 10 may not be reduced by reflecting the attenuation coefficient of the process by-products 20 in the function f for obtaining the temperature T of the substrate 10, like the attenuation coefficient η of the shield plate 120. Thus, even if the shield plate 120 is contaminated by the process by-products 20, a configuration (or method) capable of reducing the deviation in temperature T of the substrate 10 may be required.

Thus, the temperature calculation part 113 may calculate the temperature of the substrate 10, to which the contamination level of the shield plate 120 is reflected, by using the measured quantity of the reflected light 11b and 11c and the measured intensity of the radiated light 15.

In addition, the temperature measurement part 110 may further include a relation setting part 112a in which a relationship between the measured quantity of the reflected light 11b and 11c and the emissivity ε of the substrate 10 is set, and a resetting part 112b that resets the relationship between the measured quantity of the reflected light 11b and 11c and the emissivity ε of the substrate 10 by reflecting the contamination level of the shield plate 120.

The relationship setting part 112a may set the relationship between the measured quantity of reflected light 11b and 11c and the emissivity ε of the substrate 10, and the temperature calculation part 113 may determine (or calculate) the emissivity ε of the substrate 10 by using the relationship between the measured quantity of the reflected light 11b and 11c and the emissivity ε of the substrate 10, which is set in the relation setting part 112a.

The resetting part 112b may reset the relationship between the measured quantity of the reflected light 11b and 11c and the emissivity ε of the substrate 10 by reflecting the contamination level of the shield plate 120, and thus, the relationship between the measured quantity of the reflected light 11b and 11c and the emissivity ε of the substrate 10 may be changed and reset. Here, the relationship between the measured quantity of the reflected light 11b and 11c and the emissivity of the substrate 10 may be expressed as a calculation standard expression (e.g., a relational expression or a function expression), a calculation reference table (e.g., a look-up table), a calculation reference graph (e.g., a graph obtained by graphing a lookup table), and the like. In addition, the resetting of the relationship between the measured quantity of reflected light 11b and 11c and the emissivity ε of the substrate 10 may include rearrangement of the emissivity ε of the substrate 10 in the calculation reference table and/or the calculation reference graph. The relationship between the measured quantity of the reflected light 11b and 11c and the emissivity of the substrate 10 may be reset by reflecting the contamination level of the shield plate 120 to reduce the deviation in emissivity ε of the substrate 10 and the deviation in temperature T of the substrate 10 even if the shield plate 120 is contaminated by the process by-products 20. Here, the relationship setting part 112a and the resetting part 112b may constitute a contamination level reflection part 112, and the contamination level reflection part 112 may reflect the contamination level of the shield plate 120 in the temperature T of the substrate 10, which is calculated in the temperature calculation part 113.

For example, the resetting part 112b may include a reflection quantity correction part that corrects the measured quantity of the reflected light 11b and 11c in accordance with the contamination level of the shield plate 120 to transmit the corrected value to the temperature calculation part 113. Here, the resetting part 112b may be the reflection quantity correction part.

The reflection quantity correction part may correct the measured quantity of the reflected light 11b and 11c by reflecting the contamination level of the shield plate 120. Thus, the reflection quantity correction part may correct the measured quantity of the reflected light 11b and 11c in accordance with the contamination level of the shield plate 120 to rest the relationship between the measured quantity of the reflected light 11b and 11c and the emissivity ε of the substrate 10. In addition, the reflection quantity correction part may transmit the corrected quantity of the reflected light to the temperature calculation part 113, and when the reflected quantity corrected by the reflection quantity correction part is transmitted, the temperature calculation part 113 may calculate the temperature T of the substrate 10, in which the temperature deviation is reduced, by using the corrected quantity of the reflected light and the intensity of the radiant light 15 received in the light receiving part 111b. Thus, the temperature measurement deviation of the temperature measurement part 110 due to the contamination of the shield plate 120 may be reduced within an allowable error range.

In addition, the temperature calculation part 113 may calculate the temperature T of the substrate 10 using the emissivity ε of the substrate 10, which is determined by the reset relationship between the measured quantity of the reflected light 11b and/or 11c and the emissivity ε of the substrate 10, and the emission E emitted from the substrate 10. Here, the emission E emitted from the substrate 10 is determined in accordance with the intensity of the radiant light 15. Thus, the temperature T of the substrate 10, in which the temperature deviation is reduced, may be calculated. Here, the temperature calculation part 113 may calculate the emissivity ε of the substrate 10 having the reduced deviation by only applying (or substituting) the measured quantity of the reflected lights 11b and 11c to the reset relationship between the measured quantity of the reflected lights 11b and 11c and the emissivity ε of the substrate 10.

In the apparatus 100 for processing the substrate, the contamination level of the shield plate 120 may be reflected through the resetting part 112b to reset the relationship between the measured quantity of the reflected lights 11b and 11c and the emissivity ε of the substrate 10 to reduce in deviation in emissivity ε of the substrate 10, which is determined by the relationship between the measured quantity of the reflected light 11b and 11c and the emissivity ε of the substrate 10. Thus, the deviation in temperature T of the substrate 10 calculated using the emissivity ε of the substrate 10 may also be reduced. That is, the temperature measurement deviation of the temperature measurement part 110 due to the contamination of the shield plate 120 may be reduced within an allowable error range. In addition, since the processing process may be performed for a predetermined period even when the shield plate 120 is contaminated, the replacement cycle of the shield plate 120 may increase to reduce the process cost, thereby improving the productivity by reducing the downtime.

The temperature measurement part 110 may further include an optical rod 115 that guides the reflected light 11b and 11c reflected from the substrate 10 or the shield plate 120 to the light receiving part 111b. The optical rod 115 may induce (or guide) the reflected light 11b and 11c reflected from the substrate 10 or the shield plate 120 to the light receiving part 111*b* and also may gather the light IIa emitted from the light source 111*a* in one direction (e.g., toward the substrate) so that the light 11*a* has straightness without being spread. For example, the optical rod 115 may be supported by the support member 50, and the shield plate 120 may be provided between the optical rod 115 and the substrate 10 (i.e., between the optical rod and the edge ring) to prevent the optical rod 115 from being contaminated.

The apparatus 100 for processing the substrate may further includes a contamination level measurement part 130 that measures the contamination level of the shield plate 120 using a reflection quantity of the light 11*a* irradiated toward the shield plate 120, which is reflected by the shield plate 120 and received.

The contamination level measurement part 130 may measure the contamination level of the shield plate 120 by using the reflection quantity of the light 11*a* irradiated toward the shield plate 120, which is reflected by the shield plate 120 and received. Here, the contamination level of the shield plate 120 may be determined in accordance with the deposition thickness of the process by-products 20, and the deposition thickness of the process by-products 20 may be calculated by the reflection quantity.

Figure 3:
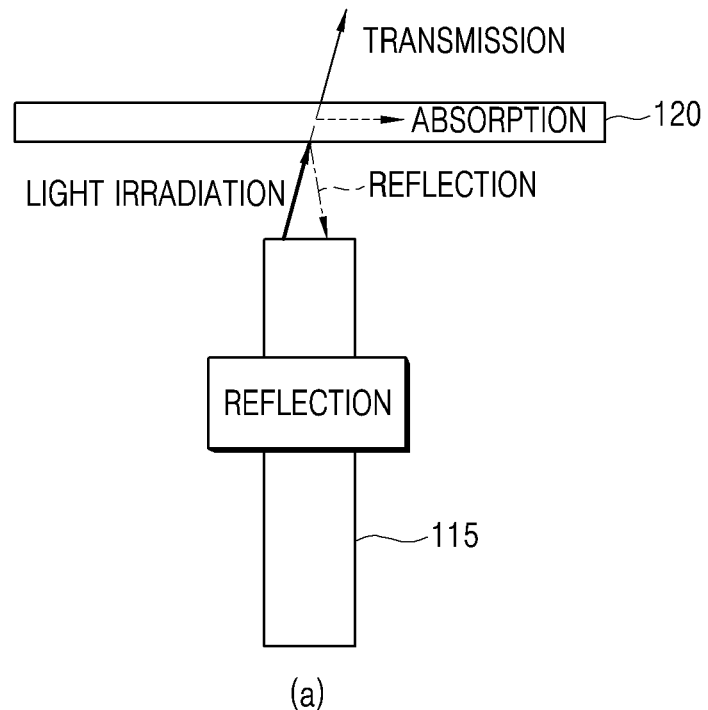
FIG. 3 is a conceptual view for explaining measurement of a contamination level of a shield plate in accordance with an exemplary embodiment.
Figure 3:
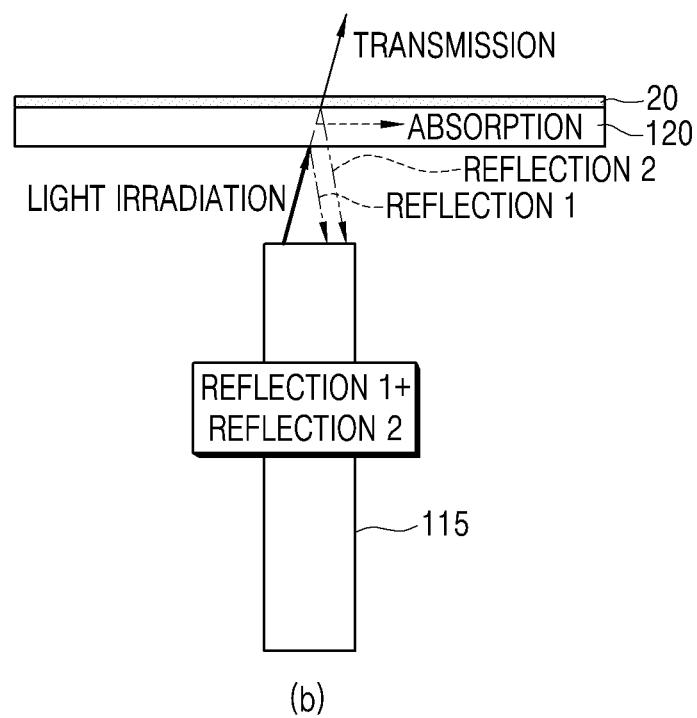

FIG. 3 is a conceptual view for explaining measurement of the contamination level of the shield plate in accordance with an exemplary embodiment. Here, (a) of FIG. 3 illustrates a state in which the shield plate is not contaminated, and (b) of FIG. 3 illustrates a state in which the shield plate is contaminated.

Referring to FIG. 3, when the shield plate 120 is not contaminated, the reflection may occur only in the shield plate 120 as illustrated in (a) of FIG. 3, but as illustrated in (b) of FIG. 3, when the shield plate 120 is contaminated, the reflection may occur in the process by-products 20 as well as the shield plate 120, and thus, as the contamination level of the shield plate 120 increases, the reflection quantity may increase. That is, when the shield plate 120 is not contaminated, the reflection quantity becomes reflection (=reflection 1), but when the shield plate 120 is contaminated, the reflection quantity becomes reflection 1+reflection 2. Thus, when the shield plate 120 is contaminated, the reflection quantity is greater by the reflection 2 than the reflection quantity when the shield plate 120 is not contaminated. Here, the contamination level of the shield plate 120 may be measured in the absence of the substrate 10, or the contamination level of the shield plate 120 may be measured in the presence of the substrate 10. Also, in the state in which the substrate 10 is present, the quantity of the reflected light 11*c* reflected from the substrate 10 may also be included in the reflection quantity, and thus it is necessary to consider this case.

In addition, the contamination level measurement part 130 may include a reflection quantity acquisition part 131 that acquires the reflection quantity by the light 11*b* reflected from(or by) the shield plate 120 and received, and a contamination level calculation part 132 that calculates the contamination level of the shield plate 120 by calculating a difference value between the acquired reflection quantity and the reference reflection quantity of the shield plate 120. The reflection quantity acquisition part 131 may acquire the reflection quantity by the light 1 lb reflected by the shield plate 120 and received from the shield plate 120. Here, the reflection quantity acquisition part 131 may directly measure and acquire the reflection quantity of the light reflected and received from the shield plate 120 or may acquire the reflection quantity by receiving the reflection quantity from the temperature measurement part 110. For example, in the case of receiving and acquiring the reflection quantity from the temperature measurement part 110, the reflection quantity acquisition part 131 may be connected to the temperature measurement part 110 in a wired or wireless manner, and thus, the light IIa may be irradiated from the light source 111*a* toward the shield plate 120 to receive the reflection quantity from the light receiving part that receive the reflected light 11*b* reflected by the shield plate 120. Also, when the reflection quantity of the light reflected and received from the shield plate 120 is directly measured and obtained, the reflection quantity acquisition part 131 may be connected to a separate second light source (not shown) and a second light receiving part (not shown) to irradiate the light to the second light sources (not shown) and receive the light reflected from the shield plate 120 into the second light receiving part (not shown), thereby acquiring the reflection quantity.

The contamination level calculation part 132 may calculate the contamination level of the shield plate 120 in accordance with the acquired reflection quantity and calculate a difference value V (variation) between the acquired reflection quantity and the reference reflection quantity of the shield plate 120, thereby calculating the contamination level of the shield plate 120. Here, the contamination level calculation part 132 may compare the acquired reflection quantity to the reference reflection quantity of the shield plate 120 to calculate the contamination level of the shield plate 120 in accordance with the difference (value) between the acquired reflection quantity and the reference reflection quantity of the shield plate 120. Here, the reference reflection quantity of the shield plate 120 may be a reflection quantity measured (or received) when the shield plate 120 is not contaminated.

For example, the contamination level of the shield plate 120 may be calculated in accordance with a difference value (e.g., reflection 2) between the acquired reflection quantity and the reference reflection quantity of the shield plate 120. In this case, as the difference value V increases, the contamination level of the shield plate 120 may increase in proportion, and the difference value V may be expressed as a numerical value between 0 and 1. Here, '0' may mean that the difference value V is 0 when the shield plate 120 without having the process by-products 20 is not contaminated, and '1' may mean that the contamination level of the shield plate 120 when the process by-products 20 are deposited beyond a required thickness at which the shield plate 120 has to be replaced.

When measuring the contamination level of the shield plate 120 in the presence of the substrate 10, the quantity of the reflected light 11*c* reflected from the substrate 10 has to be considered, and also, since the reflected light 11*c* reflected from the substrate 10 may not be reflected and absorbed in the process by-product 20 and the shield plate 120, it is difficult to check how much of the reflected light 11*c* reflected from the substrate 10 is contained in the acquired reflection quantity, and thus, it is difficult to calculate an exact contamination level. However, as the difference value V increases, characteristics of increasing in contamination level of the shield plate 120 may be maintained, and thus, a similar contamination level of the shield plate 120 may be obtained. For this reason, to accurately calculate the contamination level of the shield plate 120, it may be preferable to measure the contamination level of the shield plate 120 in the state of the absence of the substrate 10.

Figure 4:
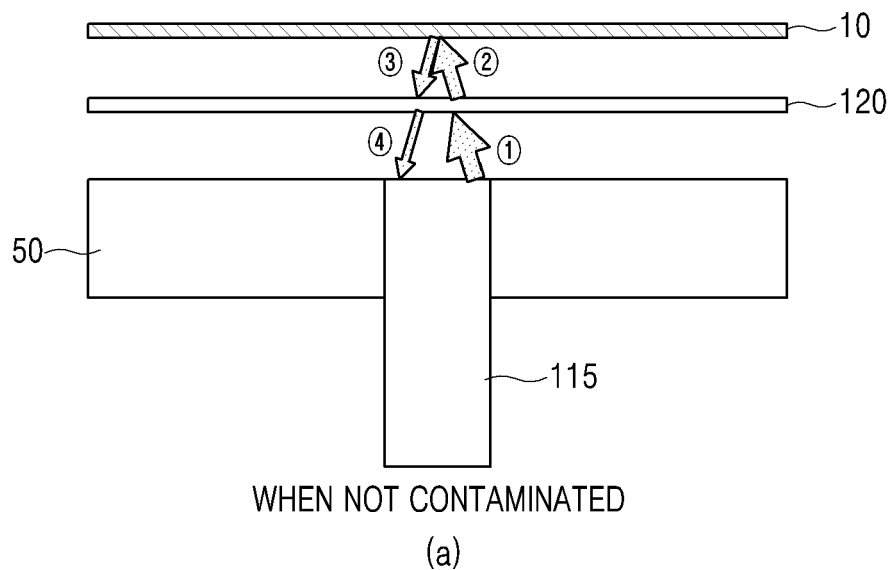
FIG. 4 is a conceptual view for explaining a difference in reflection quantity due to contamination of the shield plate in accordance with an exemplary embodiment.
Figure 4:
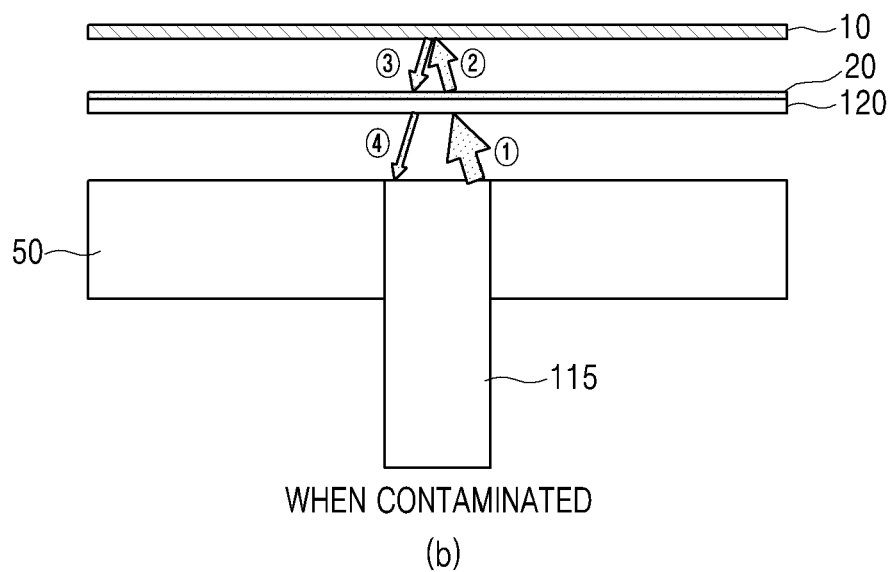

FIG. 4 is a conceptual view for explaining a difference in reflection quantity due to contamination of the shield plate in accordance with an exemplary embodiment. Here, (a) of FIG. 4 illustrates a process, in which light is irradiated from the optical rod and reflected by the substrate and then is incident again into the optical rod when the shield plate is not contaminated, and (a) of FIG. 4 illustrates a process, in which light is irradiated from the optical rod and reflected by the substrate and then is incident again into the optical rod when the shield plate is contaminated.

Referring to FIG. 4, when the shield plate 120 is not contaminated, light ① emitted from the optical rod 115 may pass through the shield plate 120 to reach the substrate 10 as illustrated in (a) of FIG. 4. As a result, the light may be reflected and/or absorbed from/into only the shield plate 120 so that the quantity of light is reduced, like the light ② passing through the shield plate 120, and also, the light ② passing through the shield plate 120 reaches the substrate 10 and is partially absorbed and/or transmitted, and thus, the quantity of the reflected light ③, which is reflected by the substrate 10 may be more reduced. Then, the reflected light ③ reflected from the substrate 10 may pass through the shield plate 120 and be incident again into the optical rod 115 and thus may be reflected and/or absorbed only by the shield plate 120, and as a result, the light quantity may be more reduced, like the reflected light ④ passing through the shield plate 120.

On the other hand, when the shield plate 120 is contaminated, light ① emitted from the optical rod 115 may pass through the shield plate 120 to reach the substrate 10 as illustrated in (b) of FIG. 4. As a result, the light may be reflected and/or absorbed from/into only the shield plate 120 and the process by-products 20 so that the quantity of light is reduced together with the light ② passing through the shield plate 120, and also, the light ② passing through the shield plate 120 reaches the substrate 10 and is partially absorbed and/or transmitted, and thus, the quantity of the reflected light ③, which is reflected by the substrate 10 may be more reduced. Then, the reflected light ③ reflected from the substrate 10 may pass through the shield plate 120 and be incident again into the optical rod 115 and thus may be reflected and/or absorbed only by the process by-products 20 and the shield plate 120, and as a result, the light quantity may be more reduced, like the reflected light ④ passing through the shield plate 120.

Here, even when the quantities of light ① emitted from the optical rod 115 are the same when the shield plate 120 is contaminated and not contaminated, when the shield plate 120 is contaminated, since the reflection and/or absorption may occur in not only the shield plate 120 but also the process by-products 20, the light passing through the shield plate 120, the reflected light ③ reflected from the substrate 10, and the reflected light ④ passing through the shield plate 120 may be reduced compared to those when the shield plate 120 is not contaminated.

FIG. 4 illustrates only the variation in quantity of light emitted from the optical rod 115, reflected by the substrate 10, and incident again into the optical rod 115, and the reflected light ④ passing through the shield plate 120 may correspond to the reflected light 11c reflected by the substrate 10. In this case, the reflected light 11b and 11c substantially received by the light receiving part 111b may include not only the reflected light 11b (reflection 1) reflected from the shield plate 120, but also the reflected light (reflection 2) reflected from the process by-products 20.

The resetting part 112b may primarily reset the relationship between the measured quantity of reflected light 11b and 11c and the emissivity ε of the substrate 10 by reflecting the difference value V calculated by the contamination level calculation part 132. Here, the resetting part 112b may primarily reset the relationship between the measured quantity of the reflected light 11b and 11c and the emissivity ε of the substrate 10 in a direction (increasing direction) in which the value of the emissivity ε of the substrate 10 increases with respect to the measured total quantity of the reflected light 11b and 11c. Here, the increasing quantity of the emissivity ε of the substrate 10 with respect to the measured quantity of the reflected light 11b and 11c at the time of the primary resetting may be the same as in at least some sections of the measured quantity of the reflected light 11b and 11c.

For example, when the relationship between the measured quantity of the reflected light 11b and 11c and the emissivity ε of the substrate 10 is a calculation standard expression, the emissivity ε of the substrate 10 may be expressed as a function ($\varepsilon=f1(R)$) related to the quantity (reflection) of the reflected light, and the function of the emissivity ε of the substrate 10 may be changed from $f1(R)$ into $f1(R-V)$ so as to be primarily reset. Thus, in the primarily reset function $f1(R-V)$, the measured quantity of the reflected light 11b and 11c may be applied only in the variable R, a value that is smaller by the difference value V than the quantity of the reflected light 11b and 11c may be applied to the variable R in the reset function $f1(R-V)$ to obtain an effect of calculating the emissivity ε of the substrate 10.

In addition, the relationship between the measured quantity of the reflected light 11b and 11c and the emissivity ε of the substrate 10 may be a calculation reference table and/or a calculation reference graph. In this case, the calculation reference table or the calculation reference graph may be reset (or modified or changed) so that the emissivity ε of the substrate 10 is directly calculated without correcting the measured quantity of the reflected light 11b and 11c. The emissivity ε of the substrate 10 and the temperature T of the substrate 10, in which the measurement deviation due to the contamination (level) of the shield plate 120 is reduced, may be calculated without correcting the measured quantity of the reflected light 11b and 11c.

When the resetting part 112b includes the reflection quantity correction part, the reflection quantity correction part may subtract the difference value V calculated by the contamination level calculation part 132 from the measured quantity of the reflected light 11b and 11c to perform the primary correction. Thus, the relationship between the measured quantity of the reflected light 11b and 11c and the emissivity ε of the substrate 10 may be primarily reset. That is, the quantity of the reflected light, which is primarily corrected, may be less by the difference value V than the quantity of the reflected light 11b and 11c, which is received by the light receiving part 111b. For example, the emissivity ε of the substrate 10 may be calculated by applying (or substituting) the value that is less by the difference value V than the quantity of the reflected light 11b and 11c, which is received by the light receiving part 111b, to the variable R of the function $f1(R)$ of the emissivity ε of the substrate 10. As the shield plate 120 is contaminated, the acquired reflection quantity increases compared to when the shield plate 120 is not contaminated. Therefore, the difference value V may be subtracted from the quantity of the reflected light 11b and 11c received by the light receiving part 111b so that the reflection quantity is similar to the quantity of the reflected light 11b and 11c received from the light receiving part 111b when the shield plate 120 is not contaminated. Here, the difference value calculated by the contamination level calculation part 132 may vary depending on the contamination level of the shield plate 120, and before starting the substrate 10 processing process (e.g., thermal processing process), the contamination level of the shield plate 120 may be measured to calculate the difference value V in advance.

Figure 5:
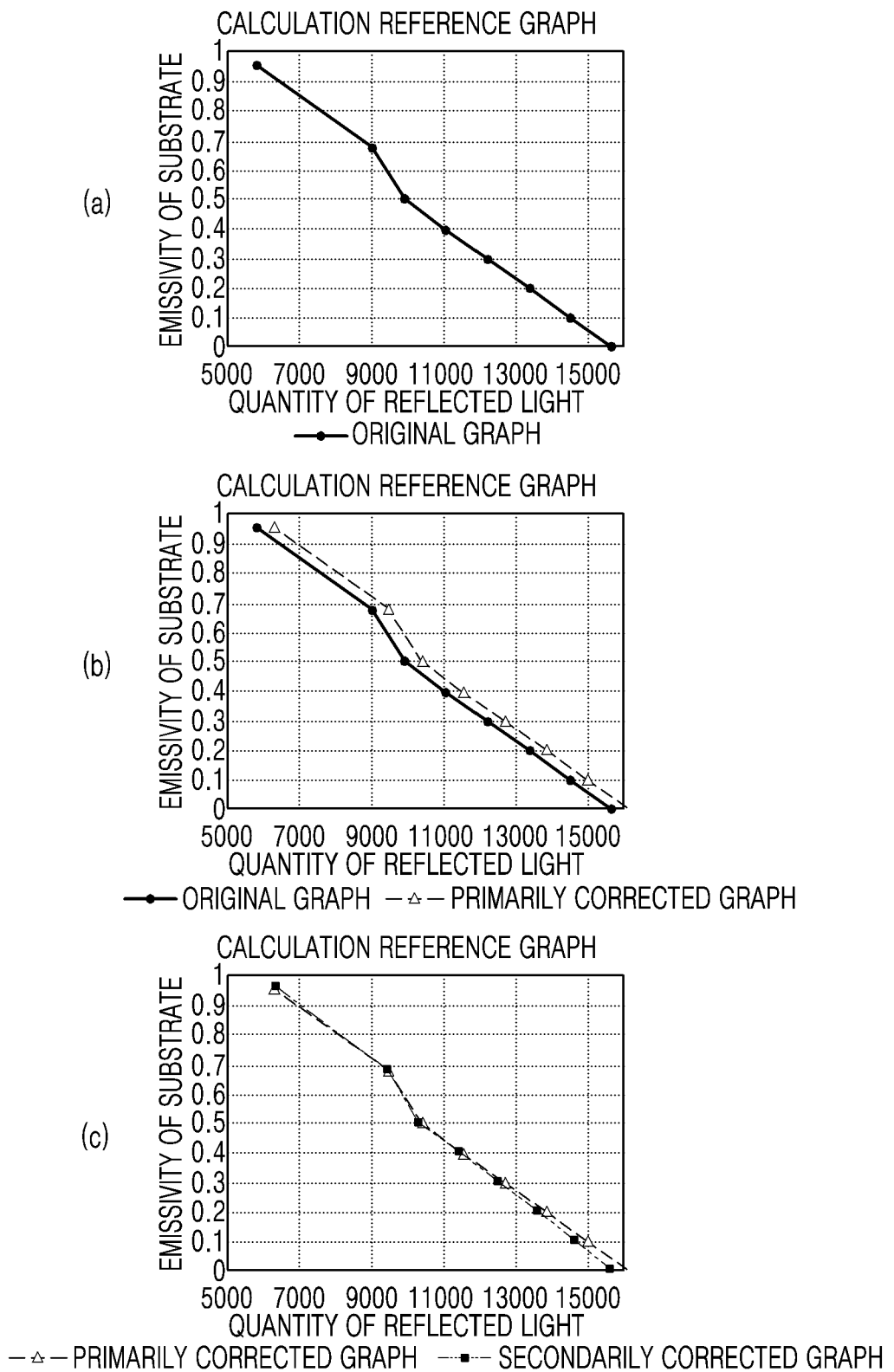
FIG. 5 is a graph for explaining resetting of a relationship between a quantity of reflected light, which is measured, and an emissivity of a substrate in accordance with an exemplary embodiment.

FIG. 5 is a graph for explaining resetting of the relationship between a quantity of reflected light, which is measured, and an emissivity of a substrate in accordance with an exemplary embodiment. Here, (a) of FIG. 5 is a calculation reference graph showing the relationship between the measured quantity of the reflected light and the emissivity of the substrate, (b) of FIG. 5 is a calculation reference graph showing the primarily reset relationship between the measured quantity of the reflected light and the emissivity of the substrate, and (c) of FIG. 5 is a calculation reference graph showing a secondarily reset relationship between the measured quantity of the reflected light and the emissivity of the substrate.

Referring to FIG. 5, in the primary reset(ting), the calculation reference graph (i.e., an original graph) may move along an axis of the quantity R of the reflected light by the difference value V as illustrated in (b) of FIG. 5 and move in a direction (i.e., a right side in the graph of FIG. 5) in which the quantity R of the reflected light increases.

Thus, even when the shield plate 120 is contaminated, the emissivity of the substrate 10 may be calculated to be similar to (or within the allowable error range) the emissivity ε of the substrate 10 when the shield plate 120 is not contaminated with no (almost) deviation using the measured quantity of the reflected lights 11b and 11c. In addition, the reflection quantity in the process by-products 20, which acts as noise in calculating the emissivity ε of the substrate 10 may be removed. Here, it is assumed that light ② passing through the shield plate 120 with almost the same (or similar) light quantity is reflected by the substrate 10 due to the primary reset(ting) (or primary correction) when the shield plate 120 is contaminated and when the shield plate 120 is not contaminated. The quantity of the primarily corrected reflected light may be the quantity of the reflected light ③ that is reflected by the substrate pass through the contaminated shield plate 120 and has almost the same light quantity as that when the shield plate 120 is not contaminated.

In addition, the resetting part 112b may secondarily reset the (primarily reset) relationship between the measured quantity of the reflected light 11b and 11c and the emissivity ε of the substrate 10(, which is primarily reset) to compensate the emission E emitted from the substrate 10(, which is determined in accordance with the intensity of the radiant light 15). Here, the resetting part 112b may primarily reset the relationship between the measured quantity of the reflected light 11b and 11c and the emissivity ε of the substrate 10 in a direction (decreasing direction) in which the value of the emissivity ε of the substrate 10 decreases with respect to the measured quantity of the reflected light 11b and 11c in at least partial section. Here, the decreasing quantity of the emissivity ε of the substrate 10 with respect to the measured quantity of the reflected light 11b and 11c at the time of the secondarily resetting may be different in at least partial section and be proportional to the measured quantity of the reflected light 11b and 11c. The emission E emitted from the substrate 10, which decreases in accordance with the contamination level of the shield plate 120, may be compensated through the secondary reset(ting) to calculate the temperature T of the substrate 10, which is almost the same as (or similar to) that calculated using the emission E actually emitted from the substrate 10 and the emissivity ε of the substrate 10, and also, the temperature measurement deviation of the temperature measurement part 110 may be minimized For example, when the relationship between the measured quantity of the reflected light 11b and 11c and the emissivity ε of the substrate 10 is the calculation standard expression, the relationship may be secondarily reset by changing the function of the emissivity ε of the substrate 10 from f1(R) to f1(R−V+C), and a constant C may be a correction value C determined in accordance with the measured quantity of the reflected light 11b and 11c. Thus, in the secondarily reset function f1(R−V+C), the measured quantity of the reflected light 11b and 11c may be applied only in the variable R, a value that is smaller by the difference value V than the quantity of the reflected light 11b and 11c may be applied to the variation R in the reset function f1(R−V) to obtain an effect of calculating the emissivity ε of the substrate 10.

In addition, the relationship between the measured quantity of the reflected light 11b and 11c and the emissivity ε of the substrate 10 may be a calculation reference table and/or a calculation reference graph. In this case, the calculation reference table or the calculation reference graph may be reset so that the emissivity ε of the substrate 10 is directly calculated without correcting the measured quantity of the reflected light 11b and 11c. The emissivity ε of the substrate 10 and the temperature T of the substrate 10, which are the same as those calculated with the quantity of the reflected light 11b and 11c, which are measured when the shield plate 120 is not contaminated, without correcting the measured quantity of the reflected light 11b and 11c, may be calculated.

When the resetting part 112b includes the reflection quantity correction part, if the quantity of the primarily corrected reflected light is within the preset range, the reflection quantity correction part may add up correction values C that are different in accordance with the quantity of the primarily corrected reflected light to perform the secondary correction. Thus, the relationship between the measured quantity of the reflected light 11b and 11c and the emissivity ε of the substrate 10 may be secondarily reset. That is, the quantity of the secondarily corrected reflected light may be greater by the correction value C than the quantity of the primarily corrected reflected light when the quantity of the primarily corrected reflected light is within the preset range, and if the quantity of the primarily corrected reflected light is not within the preset range, the quantity of the secondarily corrected reflected light may be the same as the quantity of the primarily corrected reflected light.

For example, when the quantity of the primarily corrected reflected light is within a preset range, the emissivity ε of the substrate 10 may be calculated by subtracting the difference value V from the quantity of the reflected light 11b and 11c received by the light receiving part 111b and applying (or substituting) the sum of the correction value C in the variable R in the function (ε=f1(R)) of the emissivity of the substrate 10 related to the quantity R of the reflected light. When the shield plate 120 is contaminated, the reflected light ③ reflected from the substrate 10 is reflected and/or absorbed by the shield plate 120 as well as the process by-products 20 while passing through the contaminated shield plate 120. Thus, the reflected light ④ passing through the shield plate 120 may be less than that when the shield plate 120 is not contaminated. For this reason, the quantity of the reflected light 11b and 11c received by the light receiving part 111b may be almost the same as the quantity of the reflected light 11b and 11c received by the light receiving part by adding up the correction value C. Here, the correction value C may be less than the difference value V or may be very small. The quantity of reflection in the process by-products 20 may be determined in accordance with the reflectance of the process by-products 20, and since the reflectance is an intrinsic property of a material, if a quantity of incident light is large, a quantity of reflected light is also large, whereas when the quantity of the incident light is small, the quantity of the reflected light is also small. Since a quantity of the light ① emitted from the optical rod 115 is greater than that of the reflected light ③ reflected from the substrate 10, the quantity of light incident into the process by-products 20 by passing through the shield plate 120 may be greater than that of light reflected by the substrate 10 and incident into the process by-product 20, and also, a quantity of light reflected by the process by-products 20 by passing through the shield plate 120 may be greater than that of light reflected by the substrate 10 and then reflected the process by-products 20. Thus, the difference value V for deducting the reflection quantity of the light reflected from the process by-products 20 by passing through the shield plate 120 may be greater than the correction value C for compensating the reflection quantity of the light reflected from the substrate 10 and the process by-products 20.

In addition, when the shield plate 120 is contaminated, the emission E emitted from the substrate 10 by the process by-product 20 may be attenuated (e.g., attenuated by absorption and/or reflection), and the attenuation of the emission E emitted from the substrate 10 may be compensated by the correction value C.

In the secondary reset(ting), a slope of the primarily corrected calculation reference graph (i.e., the primary correction graph) may be changed based on any one point as illustrated in (c) of FIG. 5. Here, the slope (ε/R) of the primarily corrected calculation reference graph may be changed to increase (i.e., R decreases in ε/R).

That is, the correction value C may be proportional to the quantity of the primarily corrected reflected light, and the larger the quantity of the primarily corrected reflected light, the greater the correction value C may be added. As the quantity R of the reflected light and/or the quantity of the primarily corrected reflected light increases, the reflected light ③ reflected by the substrate 10 may be large, and as described above, a large amount of light incident into the process by-products 20 may be reflected by the process by-products 20. Thus, as the quantity of reflected light ③ reflected by the substrate 10 increases, the quantity of reflection reflected by the process by-products 20 also increases. Thus, a difference between the quantiles the reflected light ④ passing through the shield plate 120 when the shield plate 120 is contaminated and when the shield plate 120 is not contaminated may increase as the quantity of the primarily corrected reflected light and/or the quantity R of the reflected light. As a result, the larger the quantity of the primarily corrected reflected light or the quantity of the reflected light, the greater the correction value C may be added to compensate the difference value.

Here, it is assumed that light ④ passing through the shield plate 120 with almost the same (or similar) light quantity is received to the optical rod 115 due to the secondary reset(ting) (or secondary correction) when the shield plate 120 is contaminated and when the shield plate 120 is not contaminated. The quantity of the secondarily corrected reflected light may be the quantity of the reflected light ③ that is reflected by the substrate pass through the shield plate 120, which is not contaminated, and has almost the same light quantity as that when the shield plate 120 is not contaminated.

In addition, a predetermined value for compensating the attenuation of the emission E emitted from the substrate 10 is added to the quantity of light reflected by the process by-products 20 through the quantity of the reflected light ③ reflected by the substrate 10 to determine the correction value C. Thus, not only the emissivity E of the substrate 10 that decreases, but also the emission E emitted from the substrate 10 may be compensated in accordance with the contamination level of the shield plate 120.

The reflected light ③ reflected from the substrate 10 is very small, and thus, the quantity of the reflection reflected from the process by-products 20 has very little effect on the calculation of the emissivity ε of the substrate 10. Thus, if the reflected light ③ reflected from the substrate 10 is negligible in quantity of reflection reflected by the process by-products 20, the correction value C may not be added by excluding the reflection quantity from the preset range.

Therefore, in the primary reset(ting), the measured quantity of the reflected light 11b and/or 11c for each of the emissivity ε of the substrate 10 may increase equally, and in the secondary reset(ting), the measured quantity of the reflected light 11b and/or 11c for each of the emissivity ε of the substrate 10 may decrease differently.

Here, the temperature calculation part 113 may calculate the emissivity E of the substrate 10 using the quantity of the corrected reflected light, and the reflection quantity correction part may compensate the emissivity ε of the substrate 10 that decreases in accordance with the contamination level of the shield plate 120 through the primary correction. The temperature calculation part 113 may calculate the emissivity ε of the substrate 10 by the quantity of the reflected light 11b and 11c, and the emissivity ε of the substrate 10, which is compensated (or corrected), may be calculated using the quantity of the corrected reflected light. Thus, the temperature measurement deviation of the temperature measurement part 110 in accordance with the contamination of the shield plate 120 may be reduced. Here, the temperature measurement deviation of the temperature measurement part 110 may be reduced within the allowable error range.

The reflection quantity correction part may compensate the emissivity ε of the substrate 10 that is reduced in accordance with the contamination level of the shield plate 120 through the primary correction for primarily correcting the quantity of the reflected light 11b and 11c. Thus, the temperature T of the substrate 10, in which the temperature measurement deviation is reduced within allowable error range may be measured (or calculated) by the compensated emissivity ε of the substrate 10.

Also, the temperature calculation part 113 may calculate the emission E emitted from the substrate 10 using the intensity of the radiant light, and the reflection quantity correction part may compensate the decreasing emission E emitted from the substrate 10 in accordance with the contamination level of the shield plate 120 through the secondary correction. The temperature calculation part 113 may calculate the emission E emitted from the substrate 10 by using the intensity of the radiant light 15, and when the shield plate 120 is contaminated, the radiant light 15 may be absorbed and/or reflected by the process by-products 15 and thus may be attenuated. Thus, when the emission E emitted from the substrate 10 is calculated through the intensity of the radiant light 15 received in the light receiving part 111b, actually, the emission E emitted from the substrate 10, which is attenuated rather than the emission E emitted from the substrate 10, may be calculated.

Thus, the reflection quantity correction part may compensate the emission E emitted from the substrate 10, which is reduced in accordance with the contamination level of the shield plate 120, through the secondary correction. Here, while adding the correction value C to the quantity of the primarily corrected reflected light, the quantity of the radiant light 15 that is attenuated (or reduced) by being absorbed and/or reflected by the process by-products 20 may be reflected to the correction value C, and thus, the correction value that is greater than the correction value C for minimizing a measurement error (or calculation error) of the emissivity ε of the substrate 10 may be added to the quantity of the primarily corrected light. Thus, it is possible to compensate the emission E emitted from the attenuated substrate 10 by calculating the intensity of the radiant light 15 received by the light receiving part 111*b*. Thus, the emission E emitted from the substrate 10, which decreases in accordance with the contamination level of the shield plate 120, may be compensated through the secondary correction to calculate the temperature T of the substrate 10, which is almost the same as (or similar to) that calculated using the emission E actually emitted from the substrate 10 and the emissivity ε of the substrate 10, and also, the temperature measurement deviation of the temperature measurement part 110 may be minimized In the apparatus 100 for processing the substrate in accordance with an exemplary embodiment, a difference value between the reflection quantity acquired by the reflection quantity acquisition part 131 and the reference reflection quantity of the shield plate 120 may be calculated in the contamination level calculation part 132, and the calculated difference value V may be reflected to primarily reset the relationship therebetween the simply measured quantity of the reflected light 11*b* and 11*c* and the simply emissivity ε of the substrate 10. Thus, the emissivity ε of the substrate 10 may be compensated. In addition, the relationship between the measured quantity of the reflected light 11*b* and 11*c* and the emissivity of the substrate 10 may be secondarily reset to compensate the emission E emitted from the substrate 10, which is determined in accordance with the intensity of the radiation light 15, thereby minimizing the temperature measurement deviation of the temperature measurement part 110. That is, due to the resetting of the relationship between the measured quantity of the reflected light 11*b* and 11*c* and the emissivity of the substrate 10, the emissivity ε of the substrate 10 may be corrected to almost the same as (or similar to) the actual emissivity ε of the substrate 10 to be measured. Since the temperature T of the substrate 10 is calculated using the emissivity ε of the substrate 10 corrected as described above, the temperature T of the substrate 10 may be calculated to almost the same as (or similar to) the actual temperature T of the substrate 10. In addition, the emission E emitted from the substrate 10 that is reduced in accordance with the contamination level of the shield plate 120 may be compensated through the secondary reset(ting), and thus, the temperature T of the substrate 10 that is minimized in deviation from the actual temperature T of the substrate 10 may be calculated (or measured).

The apparatus 100 for processing the substrate in accordance with an exemplary embodiment may further include an emissivity relationship storage part (not shown) in which the relationship between the measured quantity of the reflected light 11*b* and 11*c* and the emissivity of the substrate 10 is stored in accordance with the contamination level of the shield plate 120. The resetting part 112*b* may select the relationship between the measured quantity of the reflected light 11*b* and 11*c* and the emissivity ε of the substrate 10 in accordance with the contamination level of the shield plate 120 measured in the contamination level measurement part 130.

The emissivity relationship storage part (not shown) may store the relationship between the measured quantity of the reflected light 11*b* and 11*c* and the emissivity ε of the substrate 10 in accordance with the contamination level of the shield plate 120. Here, the emissivity relationship storage part (not shown) may store each of the relationship between the measured quantity of the reflected light 11*b* and 11*c* and the emissivity ε of the substrate 10, which is primarily reset in accordance with the contamination level of the shield plate 120 and/or the relationship between the measured quantity of the reflected light 11*b* and 11*c* and the emissivity ε of the substrate 10, which is primarily and secondarily reset in accordance with the contamination level of the shield plate 120.

Also, the resetting part 112*b* may select the relationship between the measured quantity of the reflected light 11*b* and 11*c* and the emissivity ε of the substrate 10 in the emissivity relationship storage part in accordance with the contamination level of the shield plate 120, which is measured in the contamination level measurement part 130. Here, the resetting part 112*b* may select the primarily reset relationship between the measured quantity of the reflected light 11*b* and 11*c* and the emissivity ε of the substrate 10, which is stored in accordance with the measured contamination level of the shield plate 120 and/or the primarily and secondarily reset relationship between the measured quantity of the reflected light 11*b* and 11*c* and the emissivity ε of the substrate 10, which is stored in accordance with the measured contamination level of the shield plate 120 among the relationship(s) between the measured quantity of the reflected light 11*b* and 11*c* and the emissivity ε of the substrate 10, which are stored in the emissivity relationship storage part (not shown).

Thus, the secondary resetting may be performed at once, and a calculation speed of the temperature T of the substrate 10 may be improved.

Figure 6:
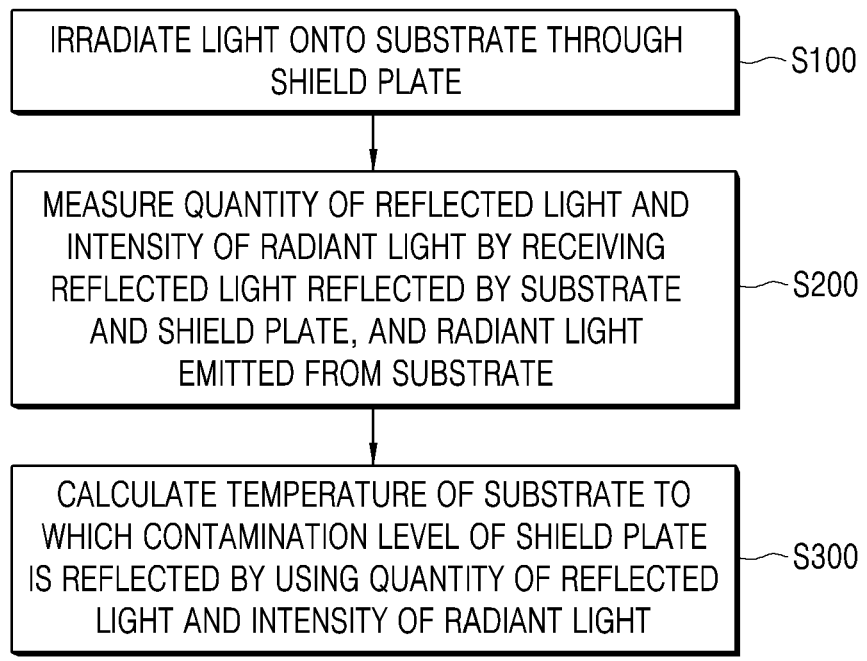
FIG. 6 is a flowchart illustrating a method for measuring a temperature of a substrate in accordance with another embodiment.

FIG. 6 is a flowchart illustrating a method for measuring a temperature of a substrate in accordance with another embodiment.

A method for processing a substrate in accordance with another exemplary embodiment will be described with reference to FIG. 6. In the description of the method for processing the substrate in accordance with another exemplary embodiment, duplicated descriptions with respect to the foregoing device of feeding the high-frequency will be omitted.

A method for measuring a temperature of a substrate in accordance with another embodiment may include a process (S100) of irradiating light through a shield plate on one surface of the substrate, a process (S200) of measuring a quantity of reflected light and an intensity of a radiant light by receiving the reflected light reflected by the substrate or/and the shield plate among the irradiated light, and the radiant light emitted from the substrate, and a process (S300) of calculating a temperature of the substrate, to which a contamination level of the shield plate is reflected, by using the measured quantity of the reflected light and the measured intensity of the radiant light.

First, light is irradiated through the shield plate on one surface of the substrate (S100). A light source 111*a* may radiate light to one surface of the substrate 10, and a shield plate 120 may be disposed between the substrate 10 and the light source 111*a* so that the light irradiated from the light source 111*a* passes through the shield plate 120 and then is irradiated to the one surface of the substrate 10.

Next, the reflected light reflected by the substrate or/and the shield plate among the irradiated light, and the radiant light emitted from the substrate may be received to measure the quantity of the reflected light and the intensity of the radiant light (S200). The light receiving part 111*b* may receive the reflected light of the light irradiated from the light source 111*a*, which is reflected from the substrate 10 or/and the shield plate 120, and the radiant light emitted from the substrate 10. For example, the light receiving part 111*b* may receive the reflected light reflected by the substrate 10 and passing through the shield plate 120 and the radiant light emitted from the substrate 10 to pass through the shield plate 120 as well as the reflected light emitted from the light source 111*a* and the reflected by the shield plate 120 so as not to pass through the shield plate 120. In addition, the light receiving part 111*b* may measure the quantity of the reflected light and the intensity of the reflected light through the received reflected light and radiant light.

Then, the temperature of the substrate to which the contamination level of the shield plate is reflected is calculated using the measured quantity of the reflected light and the intensity of the radiant light (S300). The temperature calculation part 113 may calculate the temperature of the substrate 10 by using the intensity of the radiant light and the quantity of the reflected light, calculate the emission emitted from the substrate by the intensity of the radiation, and calculate the emission of the substrate 10 by the quantity of the reflected light. In addition, the temperature of the substrate 10 may be calculated using the emission are emitted from the substrate 10 and an emissivity of the substrate 10. At this time, since the shield plate 120 is disposed between the light receiving assembly 111 and the substrate 10, a deviation may occur between the quantity of the reflected light and the intensity of the radiated light, which are received by the light receiving part 111*b*. Thus, a deviation may also occur between the emissivity of the substrate 10 and the emission emitted from the substrate 10, and thus, a deviation may also occur in the temperature of the substrate 10, which is calculated using the emissivity $\varepsilon$ and the emission. In addition, to calculate the emissivity of the substrate 10, only the reflected light reflected only from the substrate 10 and directly incident to the light receiving part 111*b* has to be used. However, since the quantity of the reflected light reflected from the substrate 10 as well as the quantity of the reflected light reflected from the shield plate 120 is used due to the shield plate 120, a deviation of the emissivity of the substrate 10 calculated using the quantity of the reflected light received to the light receiving part 11*b* may be larger. Thus, the temperature calculation part 113 may calculate the temperature of the substrate 10, to which the contamination level of the shield plate 120 is reflected, by using the measured quantity of the reflected light and the measured intensity of the radiated light.

The method for measuring the temperature of the substrate in accordance with an exemplary embodiment may further include a process (S250) of resetting a relationship between the measured quantity of reflected light and the emissivity of the substrate by reflecting the contamination level of the shield plate.

In addition, the contamination level of the shield plate may be reflected to reset the relationship between the measured quantity of reflected light and the emissivity of the substrate (S250). When the process by-products 20 are accumulated on the shield plate 120, and thus, the shield plate 120 is contaminated, the reflection and/or absorption of the light occurs in the process by-products 20 to cause a temperature deviation of the substrate 10, and thus, the contamination level of the shield plate 120 may increase. Here, as a (layer) thickness of the process by-products 20 increases, the temperature deviation of the substrate 10 increases. Thus, the resetting part 112*b* may reset the relationship between the measured quantity of reflected light and the emissivity of the substrate 10 by reflecting the contamination level of the shield plate 120. Here, the relationship between the measured quantity of the reflected light and the emissivity of the substrate 10 may be expressed as a calculation standard expression, a calculation reference table (e.g., a look-up table), a calculation reference graph (e.g., a graph obtained by graphing a lookup table), and the like. In addition, the resetting of the relationship between the measured quantity of reflected light and the emissivity of the substrate 10 may include rearrangement of the emissivity of the substrate 10 in the calculation reference table and/or the calculation reference graph. The relationship between the measured quantity of the reflected light and the emissivity of the substrate 10 may be reset by reflecting the contamination level of the shield plate 120 to reduce the deviation in emissivity of the substrate 10 and the deviation in temperature of the substrate 10 even if the shield plate 120 is contaminated by the process by-products 20.

For example, the relationship between the measured quantity of reflected light and the emissivity of the substrate 10 may be set in the relationship setting part, and the temperature calculation part 113 may determine (or calculate) the emissivity of the substrate 10 by using the relationship between the measured quantity of the reflected light and the emissivity of the substrate 10, which is set in the relation setting part 112*a*. In addition, the resetting part 112*b* may reset the relationship between the measured quantity of the reflected light and the emissivity of the substrate 10 by reflecting the contamination level of the shield plate 120, and thus, the relationship between the measured quantity of the reflected light and the emissivity of the substrate 10 may be changed and reset.

Also, in the process (S300) of calculating the temperature of the substrate, the temperature of the substrate may be calculated using the emissivity of the substrate, which is determined by the reset relationship between the measured quantity of the reflected light and the emissivity of the substrate, and the emission emitted from the substrate. Here, the emission emitted from the substrate is determined in accordance with the intensity of the radiant light. The temperature calculation part 113 may determine the emissivity of the substrate 10 based on the reset relationship between the measured quantity of the reflected light and the emissivity of the substrate 10, and the emission emitted from the substrate 10 may be determined in accordance with the intensity of the radiant light. The temperature of the substrate 10 may be calculated using the emissivity of the substrate 10 and the emission emitted from the substrate 10, and the temperature of the substrate 10 having a reduced temperature deviation may be calculated. Here, the temperature calculation part 113 may calculate the emissivity of the substrate 10 having the reduced deviation by only applying (or substituting) the measured quantity of the reflected lights to the reset relationship between the measured quantity of the reflected lights and the emissivity of the substrate 10.

The method for measuring the temperature of the substrate in accordance with an exemplary embodiment may further include a process (S50) of measuring the contamination level of the shield plate by using a reflection quantity of the light irradiated toward the shield plate, which is reflected by the shield plate and received.

The contamination level of the shield plate may be measured using the reflection quantity of the light irradiated toward the shield plate, which is reflected by the shield plate and received (S50). The contamination level measurement part 130 may measure the contamination level of the shield plate 120 by using the reflection quantity of the light irradiated toward the shield plate 120, which is reflected by the shield plate 120 and received. Here, the contamination level of the shield plate 120 may be determined in accordance with the deposition thickness of the process by-products 20, and the deposition thickness of the process by-products 20 may be calculated by the reflection quantity.

Here, the process (S50) of measuring the contamination level of the shield plate may include a process (S51) of acquiring the reflection quantity by the light reflected from (or by) the shield plate and received, and a process (S52) of calculating the contamination level of the shield plate by calculating a difference value between the acquired reflection quantity and a reference reflection quantity of the shield plate.

The reflection quantity may be obtained by the light received by being reflected by the shield plate (S51). A reflection quantity acquisition part 131 may acquire a reflection quantity of the received light reflected from the shield plate 120. Here, the reflection quantity acquisition part 131 may directly measure and acquire the reflection quantity of the light reflected and received from the shield plate 120 or may acquire the reflection quantity by receiving the reflection quantity from the temperature measurement part 110.

The contamination level of the shield plate may be calculated by calculating the difference value between the acquired reflection quantity and the reference reflection quantity of the shield plate (S52). The contamination level calculation part 132 may calculate the contamination level of the shield plate 120 in accordance with the acquired reflection quantity and also calculate the contamination level of the shield plate 120 in accordance with the difference (value) between the acquired reflection quantity and the reference reflection amount of the shield plate 120 by comparing the acquired reflection quantity to the reference reflection quantity of the shield plate 120. Here, the reference reflection quantity of the shield plate 120 may be a reflection quantity measured when the shield plate 120 is not contaminated.

That is, in the process (S51) of calculating the contamination level of the shield plate, the contamination level of the shield plate may be calculated by calculating the difference value between the acquired reflection quantity and the reference reflection quantity of the shield plate. The contamination level calculation part 132 may calculate the contamination level of the shield plate 120 by calculating the difference value between the acquired reflection quantity and the reference reflection quantity of the shield plate 120. For example, the contamination level of the shield plate 120 may be calculated in accordance with the difference value between the acquired reflection quantity and the reference reflection quantity of the shield plate 120, and as the difference value increases, the contamination level of the shield plate 120 is proportional to increase, and the difference value may be expressed as a numerical value between 0 and 1. Here, '0' may mean that the difference value is 0 when the shield plate 120 without having the process by-products 20 is not contaminated, and '1' may mean that the contamination level of the shield plate 120 when the process by-products 20 are deposited beyond a required thickness at which the shield plate 120 has to be replaced.

Also, the process (S250) of resetting the relationship between the measured quantity of the reflected light and the emissivity of the substrate may include a process (S251) of primarily resetting the relationship between the measured quantity of the reflected light and the emissivity of the substrate by reflecting the calculated difference value.

The calculated difference value may be reflected to primarily reset the relationship between the measured quantity of the reflected light and the emissivity of the substrate (S251). The relationship between the measured quantity of the reflected light and the emissivity of the substrate 10 may be primarily reset by reflecting the difference calculated by the contamination level calculation part 132. Here, the resetting part 112b may primarily reset the relationship between the measured quantity of the reflected light 11b or/and 11c and the emissivity of the substrate 10 in a direction (increasing direction) in which the value of the emissivity of the substrate 10 increases with respect to the measured total quantity of the reflected light. Here, the increasing quantity of the emissivity of the substrate 10 with respect to the measured quantity of the reflected light at the time of the primary resetting may be the same as in at least some sections of the measured quantity of the reflected light.

For example, when the resetting part 112b includes a reflection quantity correction part, the calculated difference value may be subtracted from the reflected light quantity to perform primary correction. The reflection quantity correction part may perform the primary correction by subtracting the difference value calculated by the contamination level calculation part 132 from the quantity of the reflected light. That is, the quantity of the reflected light, which is primarily corrected, may be less by the difference value than the quantity of the reflected light, which is received by the light receiving part 111b. For example, the emissivity of the substrate 10 may be defined as a function ($\varepsilon$=f1(R)) related to the quantity of the reflected light, and a value less by the difference value than the quantity of the reflected light received by the light receiving part 111b in the variable R may be applied to calculate the emissivity of the substrate 10. As the shield plate 120 is contaminated, the acquired reflection quantity increases compared to when the shield plate 120 is not contaminated. Therefore, the difference value may be subtracted from the quantity of the reflected light received by the light receiving part 111b so that the reflection quantity is similar to the quantity of the reflected light received from the light receiving part 111b when the shield plate 120 is not contaminated. Here, the difference value calculated by the contamination level calculation part 132 may vary depending on the contamination level of the shield plate 120, and before starting the substrate 10 processing process (e.g., thermal processing process), the contamination level of the shield plate 120 may be measured to calculate the difference value in advance.

Also, the process (S250) of resetting the relationship between the measured quantity of the reflected light and the emissivity of the substrate may further include a process (S252) of secondarily resetting the (primarily reset) relationship between the measured quantity of the reflected light and the emissivity of the substrate(, which is primarily reset) to compensate the emission emitted from the substrate(, which is determined in accordance with the intensity of the radiant light).

In addition, the relationship between the measured quantity of the reflected light and the emissivity of the substrate 10, which is primarily reset to compensate the emission emitted from the substrate 10(, which is determined in accordance with the intensity of the radiant light) may be secondarily reset (S252).

In addition, the resetting part 112*b* may secondarily reset the primarily reset relationship between the measured quantity of the reflected light and the emissivity of the substrate 10 to compensate the emission emitted from the substrate 10, which is determined in accordance with the intensity of the radiant light. The emission emitted from the substrate 10, which decreases in accordance with the contamination level of the shield plate 120, may be compensated through the secondary resetting to calculate the temperature of the substrate 10, which is almost the same (or similar to) that calculated using the emission actually emitted from the substrate 10 and the emissivity of the substrate 10, and also, the temperature measurement deviation of the temperature measurement part 110 may be minimized.

For example, when the resetting part 112*b* includes the reflection quantity correction part, if the quantity of the primarily corrected reflected light is within the preset range, correction values that are different in accordance with the quantity of the primarily corrected reflected light may be added up to perform the secondary correction. If the quantity of the primarily corrected reflected light is within the preset range, the reflection quantity correction part may add up correction values that are different in accordance with the quantity of the primarily corrected reflected light to perform the secondary correction. That is, the quantity of the secondly corrected reflected light may be greater by the correction value than the quantity of the primarily corrected reflected light when the quantity of the primarily corrected reflected light is within a preset range. Also, when the quantity of the primarily corrected reflected light is not within the preset range, the quantity of the secondly corrected reflected light may be the same as the quantity of the primarily corrected reflected light.

That is, the correction value may be proportional to the quantity of the primarily corrected reflected light, and the larger the quantity of the primarily corrected reflected light, the greater the correction value may be added. As the quantity of the reflected light and/or the quantity of the primarily corrected reflected light increases, the quantity of the light reflected from the substrate 10 and incident into the process by-products 20 may be large, and a large quantity of the reflected light from the process by-products 20 may be reflected. Therefore, as the quantity of the reflected light and/or the quantity of the primarily corrected reflected light increases, the quantity of the reflection reflected from the process by-products 20 may also increase. Thus, a difference between the quantiles the reflected light passing through the shield plate 120 when the shield plate 120 is contaminated and when the shield plate 120 is not contaminated may increase as the quantity of the primarily corrected reflected light and/or the quantity of the reflected light. As a result, the larger the quantity of the primarily corrected reflected light or the quantity of the reflected light, the greater the correction value may be added to compensate the difference value.

The process (S300) of calculating the temperature of the substrate includes a process (S310) of calculating the emissivity of the substrate using the corrected quantity of the reflected light and a process (S320) of calculating the emission emitted from the substrate by using the intensity of the radiant light.

The emissivity of the substrate may be calculated using the corrected quantity of the reflected light. The temperature calculation part 113 may calculate the emissivity of the substrate 10 using the corrected quantity of the reflected light. The temperature calculation part 113 may calculate the emissivity of the substrate 10 by the quantity of the reflected light, and the emissivity of the substrate 10, which is compensated (or corrected), may be calculated using the quantity of the corrected reflected light. Thus, the temperature measurement deviation of the temperature measurement part 110 in accordance with the contamination of the shield plate 120 may be reduced. Here, the temperature measurement deviation of the temperature measurement part 110 may be reduced within the allowable error range.

In addition, the emission emitted from the substrate may be calculated using the intensity of the radiant light (S320). The temperature calculation part 113 may calculate the emission emitted from the substrate 10 by using the intensity of the radiant light 15. For example, when the shield plate 120 is contaminated, the radiant light 15 may be absorbed and/or reflected by the process by-products 15 and thus may be attenuated. Thus, when the emission emitted from the substrate 10 is calculated through the intensity of the radiant light 15 received in the light receiving part 111*b*, actually, the emission emitted from the substrate 10, which is attenuated rather than the emission E emitted from the substrate 10, may be calculated.

Here, in the primarily resetting, the measured quantity of the reflected light for each of the emissivity of the substrate 10 may increase equally, and in the secondarily resetting, the measured quantity of the reflected light for each of the emissivity of the substrate 10 may decrease differently.

In the primary correction process, it is possible to compensate the emissivity of the substrate, which decreases in accordance with the contamination level of the shield plate. Thus, the reflection quantity correction part may compensate the emissivity of the substrate 10, which is reduced in accordance with the contamination level of the shield plate 120, through the primary correction. Here, the reflection quantity correction part may compensate the emissivity of the substrate 10 that is reduced in accordance with the contamination level of the shield plate 120 through the primary correction for primarily correcting the quantity of the reflected light. Thus, the temperature of the substrate 10, in which the temperature measurement deviation is reduced within allowable error range may be measured (or calculated) by the compensated emissivity of the substrate 10.

Also, in the primary correction process, it is possible to compensate the emission emitted from the substrate, which decreases in accordance with the contamination level of the shield plate. Thus, the reflection quantity correction part may compensate the emission emitted from the substrate 10, which is reduced in accordance with the contamination level of the shield plate 120, through the secondary correction. Here, while adding the correction value to the quantity of the primarily corrected reflected light, the reflection quantity correction part may reflect the quantity of the radiant light that is attenuated (or reduced) by being absorbed and/or reflected by the process by-products 20 to the correction value, and thus, the correction value that is greater than the correction value for minimizing a measurement error (or calculation error) of the emissivity of the substrate 10 may be added to the quantity of the primarily corrected light. Thus, it is possible to compensate the emission emitted from the attenuated substrate by calculating the intensity of the radiant light received by the light receiving part 111*b*. The emission emitted from the substrate 10, which decreases in accordance with the contamination level of the shield plate 120, may be compensated through the secondary correction to calculate the temperature of the substrate 10, which is almost the same (or similar to) that calculated using the emission actually emitted from the substrate 10 and the emissivity of the substrate 10, and also, the temperature measurement deviation of the temperature measurement part 110 may be minimized.

The method for measuring the temperature of the substrate in accordance with an exemplary embodiment may further include a process (S255) of storing the relationship between the measured quantity of the reflected light and the emissivity of the substrate in accordance with the contamination level of the shield plate.

The relationship between the measured quantity of the reflected light and the emissivity of the substrate may be stored in accordance with the contamination level of the shield plate (S255). The emissivity relationship storage part (not shown) may store the relationship between the measured quantity of the reflected light and the emissivity of the substrate 10 in accordance with the contamination level of the shield plate 120. Here, the emissivity relationship storage part (not shown) may store each of the relationship between the measured quantity of the reflected light and the emissivity of the substrate 10, which is primarily reset in accordance with the contamination level of the shield plate 120 and/or the relationship between the measured quantity of the reflected light and the emissivity of the substrate 10, which is primarily and secondarily reset in accordance with the contamination level of the shield plate 120.

Also, the process (S250) of resetting the relationship between the measured quantity of the reflected light and the emissivity of the substrate may be performed by selecting the relationship between the measured quantity of the reflected light and the emissivity of the substrate in accordance with the measured contamination level of the shield plate. The resetting part 112b may select the relationship between the measured quantity of the reflected light and the emissivity of the substrate 10 in the emissivity relationship storage part in accordance with the contamination level of the shield plate 120, which is measured in the contamination level measurement part 130. Here, the resetting part 112b may select the primarily reset relationship between the measured quantity of the reflected light and the emissivity of the substrate 10, which is stored in accordance with the measured contamination level of the shield plate 120 and/or the primarily and secondarily reset relationship between the measured quantity of the reflected light and the emissivity of the substrate 10, which is stored in accordance with the measured contamination level of the shield plate 120 among the relationship(s) between the measured quantity of the reflected light and the emissivity of the substrate 10, which are stored in the emissivity relationship storage part (not shown).

Thus, the secondary resetting may be performed at once, and a calculation speed of the temperature of the substrate 10 may be improved.

As described above, in this embodiment, the relationship between the measured quantity of reflected light and the emissivity of the substrate may be reset by reflecting the contamination level of the shield plate through the resetting part of the temperature measurement part to reduce the deviation in emissivity of the substrate, which is determined by the relationship between the measured quantity of the reflected light and the emissivity of the substrate. Therefore, the variations in temperature of the substrate calculated using the emissivity of the substrate may be reduced. That is, it is possible to reduce the temperature measurement deviation of the temperature measurement part due to the contamination of the shield plate. In addition, since the processing process may be performed for a predetermined period even when the shield plate is contaminated, the replacement cycle of the shield plate may increase to reduce the process cost, thereby improving the productivity by reducing the downtime. In addition, the difference between the reflection quantity acquired by the reflection quantity acquisition part of the contamination level measurement part and the reference reflection quantity of the shield plate may be calculated in the contamination level calculation part of the contamination level measurement part, and then, the calculated difference may be reflected to primarily reset the relationship of the quantity of the reflected light and the emissivity of the substrate, thereby compensating the emissivity of the substrate. In addition, in order to compensate emission emitted from the substrate, which is determined in accordance with the intensity of the radiated light, the difference in temperature measurement of the temperature measurement part can be minimized by secondary resetting the primarily reset relationship between the measured quantity of the reflected light and the emissivity of the substrate.

In the apparatus for processing the substrate in accordance with the exemplary embodiment, the relationship between the quantity of the reflected light and the emissivity of the substrate, which are measured through the resetting part of the temperature measurement part, may be reset by reflecting the contamination level of the shield plate, thereby reducing the emissivity of the substrate, which is determined by the relationship between the measured quantity of the reflected light and the emissivity of the substrate. Therefore, the variations in temperature of the substrate calculated using the emissivity of the substrate may be reduced. That is, the temperature measurement deviation of the temperature measurement part due to the contamination of the shield plate may be reduced. In addition, since the processing process may be performed for a predetermined period even when the shield plate is contaminated, the replacement cycle of the shield plate may increase to reduce the process cost, thereby improving the productivity by reducing the downtime.

In addition, the difference between the reflection quantity acquired by the reflection quantity acquisition part of the contamination level measurement part and the reference reflection quantity of the shield plate may be calculated in the contamination level calculation part of the contamination level measurement part, and then, the calculated difference may be reflected to primarily reset the relationship of the quantity of the reflected light and the emissivity of the substrate, thereby compensating the emissivity of the substrate. In addition, the relationship between the quantity of the reflected light and the emissivity of the substrate, which are measured for compensating the radiant light emitted from the substrate determined in accordance with the intensity of the radiant light may be secondarily reset to minimize the temperature measurement deviation of the temperature measurement part.

The term "~on" used in the above description includes direct contact and indirect contact at a position that is opposite to an upper and lower portion. It is also possible to locate not only the entire upper surface or the entire lower surface but also the partial upper surface or the lower surface, and it is used in the mean that it is opposed in position or contact directly to upper or lower surface.

Although embodiments have been described with reference to a number of illustrative embodiments thereof, the embodiments are not limited to the foregoing embodiments, and thus, it should be understood that numerous other modifications and embodiments can be devised by those skilled in the art that will fall within the spirit and scope of the principles of this disclosure. Hence, the real protective scope of the present invention shall be determined by the technical scope of the accompanying claims.

What is claimed is:

1. An apparatus for processing a substrate, comprising:
a temperature measurement part configured to measure a temperature of the substrate by irradiating light onto one surface of the substrate; and
a light-transmitting shield plate provided between the substrate and the temperature measurement part to prevent the temperature measurement part from being contaminated by process by-products;
wherein the temperature measurement part comprises:
a light source configured to irradiate the light toward the substrate;
a light receiving part configured to receive reflected light reflected by the substrate or the shield plate among the light irradiated from the light source, and a radiant light emitted from the substrate to measure a quantity of the reflected light and an intensity of the radiant light;
a temperature calculation part configured to calculate the temperature of the substrate by using the quantity of the reflected light and the intensity of the radiant light, which are measured;
a relationship setting part configured to set a relationship between the measured quantity of the reflected light and an emissivity of the substrate; and
a resetting part configured to reset the relationship between the measured quantity of the reflected light and the emissivity of the substrate by reflecting a contamination level of the shield plate,
wherein the temperature calculation part is configured to calculate the temperature of the substrate, by using the emissivity of the substrate, which is determined by the reset relationship between the measured quantity of the reflected light and the emissivity of the substrate, and an emission emitted from the substrate,
wherein the emission emitted from the substrate is determined in accordance with the intensity of the radiant light.

2. The apparatus of claim 1, further comprising a contamination level measurement part configured to measure the contamination level of the shield plate by using a reflection quantity of the light irradiated toward the shield plate, which is reflected by the shield plate and received.

3. The apparatus of claim 2, wherein the contamination level measurement part comprises:
a reflection quantity acquisition part configured to acquire the reflection quantity by the light reflected from the shield plate and received; and
a contamination level calculation part configured to calculate the contamination level of the shield plate by calculating a difference value between the acquired reflection quantity and a reference reflection quantity of the shield plate.

4. The apparatus of claim 3, wherein the resetting part is configured to primarily reset the relationship between the measured quantity of the reflected light and the emissivity of the substrate by reflecting the difference value calculated in the contamination level calculation part.

5. The apparatus of claim 4, wherein the resetting part is configured to secondarily reset the primarily reset relationship between the measured quantity of the reflected light and the emissivity of the substrate to compensate the emission emitted from the substrate.

6. The apparatus of claim 5, wherein, in the primary reset, the measured quantity of the reflected light equally increases for each the emissivity of the substrate, and
in the secondary reset, the measured quantity of the reflected light differently decreases for each the emissivity of the substrate.

7. The apparatus of claim 2, further comprising an emissivity relationship storage part configured to store the relationship between the measured quantity of the reflected light and the emissivity of the substrate in accordance with the contamination level of the shield plate,
wherein the resetting part is configured to select the relationship between the measured quantity of the reflected light and the emissivity of the substrate in the emissivity relationship storage part in accordance with the contamination level of the shield plate, which is measured in the contamination level measurement part.

8. A method for measuring a temperature of a substrate, the method comprising:
irradiating light through a shield plate on one surface of the substrate;
measuring a quantity of reflected light and an intensity of a radiant light by receiving the reflected light reflected by the substrate or the shield plate among the irradiated light, and the radiant light emitted from the substrate;
calculating a temperature of the substrate by using the measured quantity of the reflected light and the measured intensity of the radiant light; and
resetting a relationship between the measured quantity of the reflected light and an emissivity of the substrate by reflecting a contamination level of the shield plate,
wherein, in the calculating of the temperature of the substrate, the temperature of the substrate is calculated by using the emissivity of the substrate, which is determined by the reset relationship between the measured quantity of the reflected light and the emissivity of the substrate, and an emission emitted from the substrate,
wherein the emission emitted from the substrate is determined in accordance with the intensity of the radiant light.

9. The method of claim 8, further comprising measuring the contamination level of the shield plate by using a reflection quantity of the light irradiated toward the shield plate, which is reflected by the shield plate and received.

10. The method of claim 9, wherein the measuring of the contamination level of the shield plate comprises:
acquiring the reflection quantity by the light reflected from the shield plate and received; and
calculating the contamination level of the shield plate by calculating a difference value between the acquired reflection quantity and a reference reflection quantity of the shield plate.

11. The method of claim 10, wherein the resetting of the relationship between the measured quantity of the reflected light and the emissivity of the substrate comprises primarily resetting the relationship between the measured quantity of the reflected light and the emissivity of the substrate by reflecting the calculated difference value.

12. The method of claim 11, wherein the resetting of the relationship between the measured quantity of the reflected light and the emissivity of the substrate comprises secondarily resetting the primarily reset relationship between the measured quantity of the reflected light and the emissivity of the substrate to compensate the emission emitted from the substrate.

13. The method of claim 12, wherein, in the primarily resetting, the measured quantity of the reflected light equally increases for each the emissivity of the substrate, and in the secondarily resetting, the measured quantity of the reflected light differently decreases for each the emissivity of the substrate.

14. The method of claim 9, further comprising storing the relationship between the measured quantity of the reflected light and the emissivity of the substrate in accordance with the contamination level of the shield plate, wherein the resetting of the relationship between the measured quantity of the reflected light and the emissivity of the substrate is performed by selecting the relationship between the measured quantity of the reflected light and the emissivity of the substrate in accordance with the measured contamination level of the shield plate.

\* \* \* \* \*